United States Patent
Hofsajer et al.

(10) Patent No.: US 9,938,169 B2
(45) Date of Patent: Apr. 10, 2018

(54) METHOD AND APPARATUS FOR TREATING A FLUID

(71) Applicant: University of South Africa, Muckleneuk, Pretoria (ZA)

(72) Inventors: Ivan William Hofsajer, Edenvale (ZA); Vijaya Srinivasu Vallabhapurapu, Johannesburg (ZA); Wei Hua Ho, Johannesburg (ZA)

(73) Assignee: UNIVERSITY OF SOUTH AFRICA, Pretoria (ZA)

( * ) Notice: Subject to any disclaimer, the term of this patent is extended or adjusted under 35 U.S.C. 154(b) by 87 days.

(21) Appl. No.: 14/442,797

(22) PCT Filed: Nov. 14, 2013

(86) PCT No.: PCT/IB2013/060129
§ 371 (c)(1),
(2) Date: May 14, 2015

(87) PCT Pub. No.: WO2014/076651
PCT Pub. Date: May 22, 2014

(65) Prior Publication Data
US 2015/0299004 A1  Oct. 22, 2015

(30) Foreign Application Priority Data
Nov. 14, 2012  (ZA) .................................. 2012/08567

(51) Int. Cl.
*C02F 1/48* (2006.01)
*B01J 19/08* (2006.01)
*B01F 13/08* (2006.01)

(52) U.S. Cl.
CPC ............... *C02F 1/48* (2013.01); *B01J 19/087* (2013.01); *C02F 1/485* (2013.01); *C02F 1/488* (2013.01);
(Continued)

(58) Field of Classification Search
CPC .. C02F 1/48; C02F 1/485; C02F 1/488; C02F 2201/483; C02F 2301/026; C02F 2305/08;
(Continued)

(56) References Cited

U.S. PATENT DOCUMENTS 2,852,586 A * 9/1958 Steele ...................... H05B 6/34
241/1
3,684,090 A * 8/1972 Kilbride .................. B03C 1/247
209/214
(Continued)

FOREIGN PATENT DOCUMENTS

GB           1363294 A      8/1974
JP        2011180111 A      9/2011
(Continued)

OTHER PUBLICATIONS

Definition of "sense", Merriam-Webster Online Dictionary, Accessed Nov. 30, 2017, pp. 1-2 (Year: 2017).*
(Continued)

*Primary Examiner* — David C Mellon
(74) *Attorney, Agent, or Firm* — Dorsey & Whitney LLP

(57) ABSTRACT

A method and an apparatus for treating a fluid are disclosed. The apparatus includes a cylindrical chamber of non-magnetic material for holding a volume of fluid to be treated. The fluid contains a quantity of magnetic particles, preferably nanoparticles, having desired properties for treating the fluid. The apparatus includes a magnetic field generator for creating a non-static magnetic field within the chamber, thereby to induce motion in the magnetic particles within the chamber in use. The chamber has an inlet through which fluid to be treated can be introduced, and an outlet through which treated fluid can be removed from the chamber. Sets of windings are disposed concentrically about the chamber and arranged to create a rotating magnetic field within the (Continued)

chamber. Preferably the rotating magnetic field rotates in the opposite sense to swirling rotation of the fluid in the chamber. This enhances contact between the nano-particles and the fluid to be treated.

3 Claims, 3 Drawing Sheets

(52) U.S. Cl.
CPC ... *B01F 13/0809* (2013.01); *B01J 2219/0854* (2013.01); *B01J 2219/0864* (2013.01); *B01J 2219/0867* (2013.01); *B01J 2219/0877* (2013.01); *C02F 2201/483* (2013.01); *C02F 2301/026* (2013.01); *C02F 2305/08* (2013.01)

(58) Field of Classification Search
CPC .............. B01J 19/087; B01J 2219/0864; B01J 2219/0854; B01J 2219/0877; B01J 2219/0867; B01F 13/0809
See application file for complete search history.

(56) References Cited

U.S. PATENT DOCUMENTS

| | | | |
|---|---|---|---|
| 3,848,363 A * | 11/1974 | Lovness | B24B 31/102 241/1 |
| 3,887,457 A * | 6/1975 | Marston | B03C 1/0335 209/214 |
| 4,217,213 A | 8/1980 | Schuster et al. | |
| 4,395,746 A * | 7/1983 | Tanaka | B03C 1/24 134/1 |
| 4,560,521 A * | 12/1985 | Walling | B01F 13/0809 118/623 |
| 4,601,431 A * | 7/1986 | Watanabe | B01F 13/0809 241/172 |
| 6,346,196 B1 | 2/2002 | Bose | |
| 8,192,630 B1 | 6/2012 | Sjong | |
| 8,216,454 B2 | 7/2012 | Araseki | |
| 2004/0114458 A1 | 6/2004 | Berthier et al. | |
| 2007/0039894 A1 | 2/2007 | Cort | |
| 2007/0114181 A1 | 5/2007 | Li et al. | |
| 2010/0044934 A1 * | 2/2010 | Taniguchi | B01F 13/0809 266/234 |
| 2012/0018382 A1 | 6/2012 | Stein | |

FOREIGN PATENT DOCUMENTS

| | | |
|---|---|---|
| SU | 426705 A1 | 5/1974 |
| SU | 865369 A1 | 9/1981 |

OTHER PUBLICATIONS

United States Patent and, Trademark Office, "International Search Report for PCT/IB2013/060129", dated Mar. 27, 2014, 1 page.
European Office Action for European Patent Application No. 13855055.3, dated Apr. 12, 2017 (4 pages).
Extended European Search Report for European Patent Application No. 13855055.3, dated Mar. 23, 2016 (7 pages).

* cited by examiner ns of the apparatus of FIG. 1;
METHOD AND APPARATUS FOR TREATING A FLUID

CROSS-REFERENCE TO RELATED APPLICATIONS

The present application is a Section 371 National Stage Application of International Application No. PCT/IB2013/060129, filed on Nov. 14, 2013, which claims priority to South African Application No. 2012/08567, filed on Nov. 14, 2012, both of which are hereby incorporated by reference in their entirety.

BACKGROUND OF THE INVENTION

This invention relates to apparatus for treating a fluid and to a method of treating a fluid.

Nanoparticles have been developed by numerous researchers for various purposes. Currently they have been utilised in the medical field, for water purification, and for mixing of fluids in microfluidic channels, amongst other fields. The main advantage of nanoscale particles is the increased surface area for the same mass of particles. This increased surface area leads to the desired increased efficiencies.

In the field of water purification, nanoparticles play an equally important role. However the problem of removing the particles after purification led to the idea of a nanoparticle that has a magnetic core. These magnetic nanoparticles have been around for a while and many "removal techniques" have been developed and researched to increase the efficiency of removal.

However the purification part of the system continues to utilise mechanical excitation methods in order to physically excite the nanoparticle with respect to the fluid to be treated in order for the chemical nature of the purification to take place. These methods usually involve some moving parts and, as with all moving parts, they eventually lead to wear and tear maintenance issues.

It is an object of the invention to provide an alternative method and apparatus for treating a fluid.

SUMMARY OF THE INVENTION

According to the invention there is provided apparatus for treating a fluid, the apparatus comprising:
  a chamber for holding a volume of fluid to be treated, the fluid containing magnetic particles; and
  a magnetic field generator for creating a non-static magnetic field within the chamber, thereby to induce motion in magnetic particles within the chamber in use.

The chamber preferably includes an inlet through which fluid to be treated can be introduced, and an outlet through which treated fluid can be removed from the chamber.

The chamber is preferably constructed from a non-magnetic material.

For example, the chamber may comprise a plastics material.

The magnetic field generator may comprise a plurality of windings disposed about the chamber.

For example, the chamber may be cylindrical, and the magnetic field generator may comprise two or more sets of windings disposed concentrically about the chamber and arranged to create a rotating magnetic field within the chamber.

Preferably the windings of each set of windings are arranged in pairs, with the windings of each pair of windings being diametrically opposed to one another.

In a preferred example embodiment the magnetic field generator comprises three pairs of windings, with each pair of windings being rotated by 120° from the next set of windings about the centre of the magnetic field generator.

The chamber may have an associated central core of magnetic material such as iron or steel to guide or shape the magnetic field.

The magnetic material should be shaped to concentrate the magnetic field in the chamber.

The apparatus may include an auxiliary magnetic field generator which is arranged to generate a magnetic field which interacts with the magnetic particles to urge them towards the inlet end of the chamber to prevent the particles from being expelled from the chamber in use.

Further according to the invention there is provided a method of treating a fluid, the method comprising:
  introducing a volume of fluid to be treated into a treatment chamber together with a quantity of magnetic particles having desired treatment properties; and
  generating a non-static magnetic field within the chamber to induce motion in the magnetic particles within the treatment chamber, thereby to enhance interaction of the magnetic particles with the fluid to be treated.

In one embodiment, the non-static magnetic field is a rotating magnetic field which induces rotary motion of the magnetic particles within the treatment chamber. Embodiments in which the motion of the particles is different, for example linear or oscillating, are also possible.

In a preferred example embodiment, the rotating magnetic field is generated by three pairs of windings connected to a three phase AC supply so that the respective currents in the windings vary sinusoidally in time and the current in each pair of windings is time-shifted by 120° relative to the current in the adjacent windings.

The magnetic particles are preferably nanoparticles having both magnetic properties responsive to the non-static magnetic field, and chemical properties selected for interaction with the fluid to be treated.

DESCRIPTION OF AN EMBODIMENT

Figure 1:
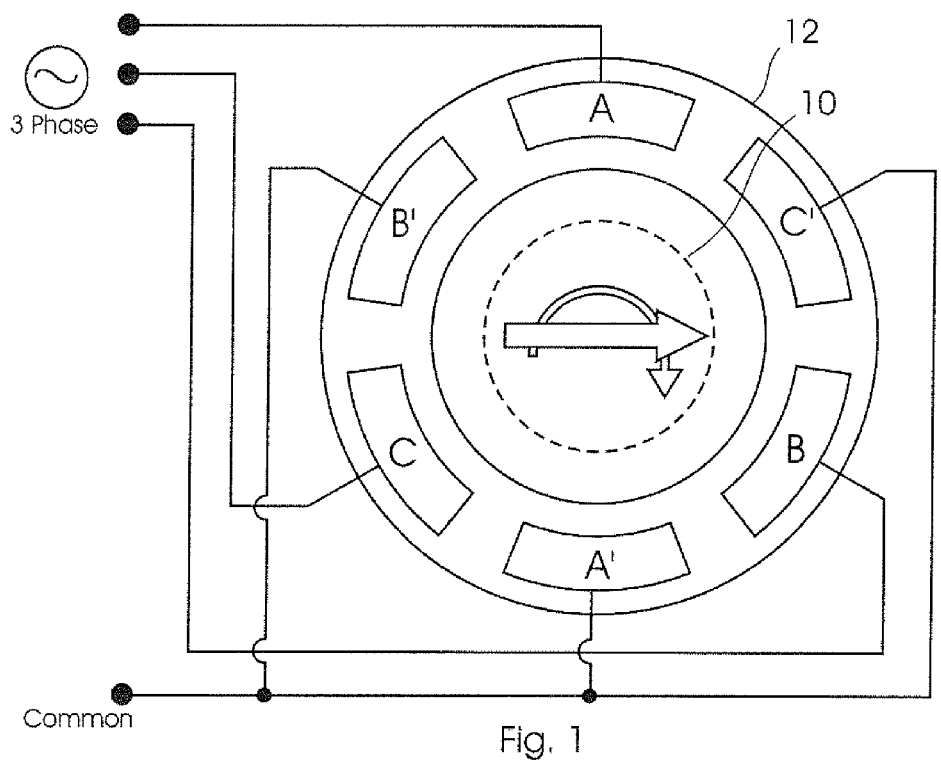
FIG. 1 is a schematic diagram in plan showing the general layout of apparatus for treating a fluid according to an example embodiment of the present invention.

FIG. 1 is a schematic diagram showing, in plan, the general arrangement of apparatus for treating a fluid according to an example embodiment of the present invention.

Essentially, the apparatus comprises two main components: a treatment chamber 10 and a magnetic field generator 12. In the illustrated embodiment, the treatment chamber 10 is generally cylindrical, with the magnetic field generator being disposed concentrically about the chamber. The construction of a prototype of the apparatus is described in more detail below with reference to FIGS. 3 and 4.

As can be seen from FIG. 1, the magnetic field generator comprises three pairs of windings A-A', B-B' and C-C'. The windings of each pair of windings are diametrically opposed to one another as illustrated, and each pair of windings is rotated by 120° from the next set of windings about the centre of the magnetic field generator. In the prototype apparatus, these windings comprised the stator windings of a commercial three phase induction motor.

The three pairs of windings are connected to a three phase AC mains supply. The respective currents in the windings vary sinusoidally in time and the current in each pair of windings is time-shifted by 120° relative to the current in the adjacent windings. The existence of these currents in three pairs of coils arranged 120° apart around the circumference of a circle will cause a magnetic field inside the circle which will appear to rotate, which is the principle behind the operation of an induction motor. This is because the alternating currents in the respective windings peak at different times, so that the resultant magnetic field appears to move in space although the windings themselves are stationary.

Figure 2:
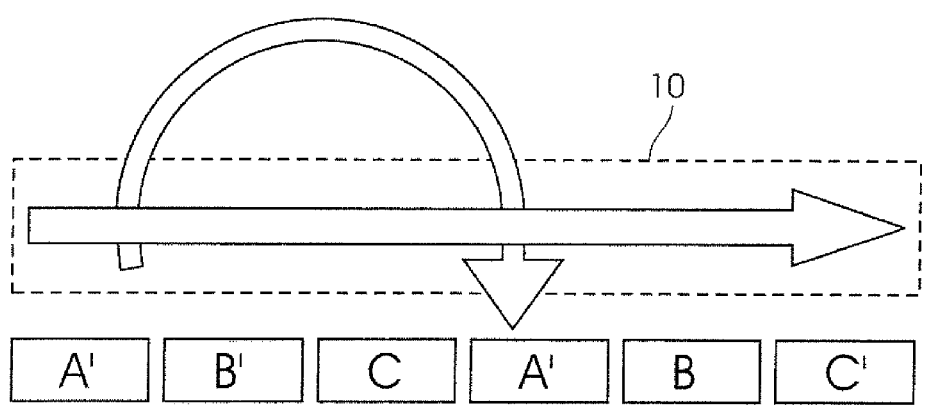
FIG. 2 is a schematic diagram illustrating the principle of operation of a magnetic field generator of the apparatus of FIG. 1.

The schematic diagram of FIG. 2 illustrates the above principle of operation.

Figure 3:
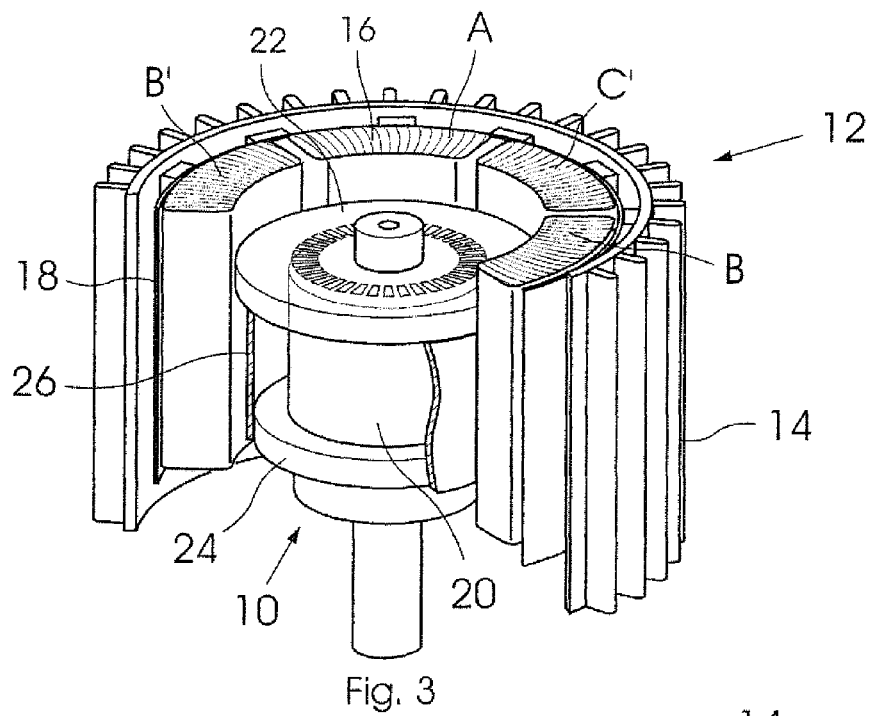
FIG. 3 is a partial sectional perspective view of a practical embodiment of the apparatus of FIG. 1.
Figure 4:
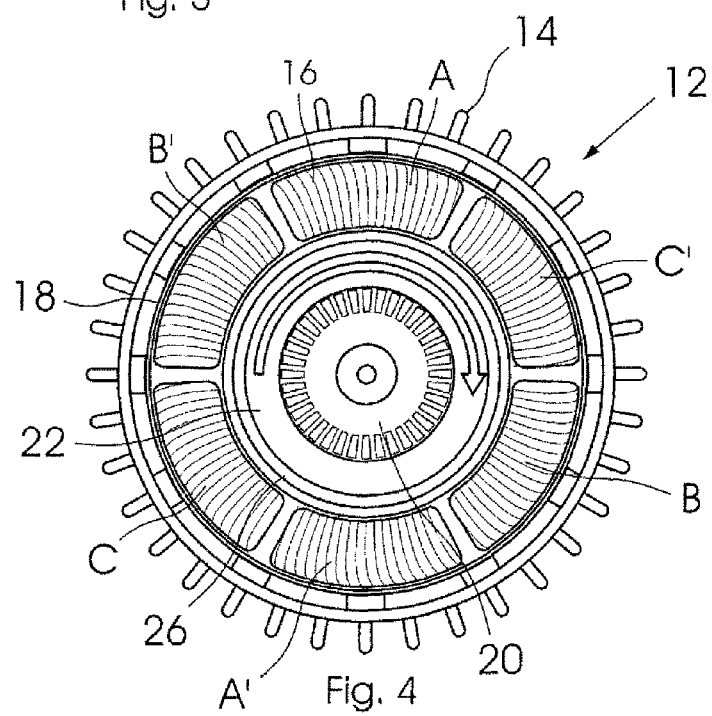
FIG. 4 is a plan view of the apparatus of FIG. 3.

Referring now to FIGS. 3 and 4, a practical prototype of the apparatus is shown. FIG. 3 is a perspective view of the apparatus, partially cut away to show the configuration thereof. FIG. 4 is a plan view of the apparatus of FIG. 3.

The apparatus makes use of a conventional three phase induction motor to provide the magnetic field generator of the apparatus. Thus, the magnetic field generator 12 comprises the housing 14 of the induction motor, and three pairs of stator windings 16 which are supported on a cylindrical former 18 within the housing 14. The treatment chamber 10 takes the place of the rotor of the induction motor and has a cylindrical steel core 20 at its centre which serves to guide the magnetic field as it traverses the space where the rotor of the induction motor would normally be.

The treatment chamber surrounds the core 20 and comprises upper and lower end plates 22 and 24 and a circumferential outer wall 26, defining an annular volume between the core and the outer wall 26. The upper and lower end plates and the outer wall are constructed from suitable non-magnetic materials. In the prototype apparatus a clear plastics material was used to allow observation of the contents of the chamber.

If a fluid to be treated containing particles with magnetic properties is introduced into the treatment chamber 10, operation of the magnetic field generator will cause generally rotary movement of the magnetic particles in the treatment chamber. For example, the fluid may be a liquid to be treated, such as water requiring purification, and the particles are preferably nanoparticles having magnetic properties as well as appropriate characteristics for purifying the water.

In an experiment using a four pole induction motor as the basis for the magnetic generator, a 50 Hz AC supply was applied to the stator, giving rise to a 25 Hz rotating magnetic field in the treatment chamber with a magnetic field of approximately 0.15 T. Magnetic particles suspended in liquid within the treatment chamber were observed moving in a rotary fashion around the treatment chamber while simultaneously exhibiting complex localized vortex motion.

Figure 5:
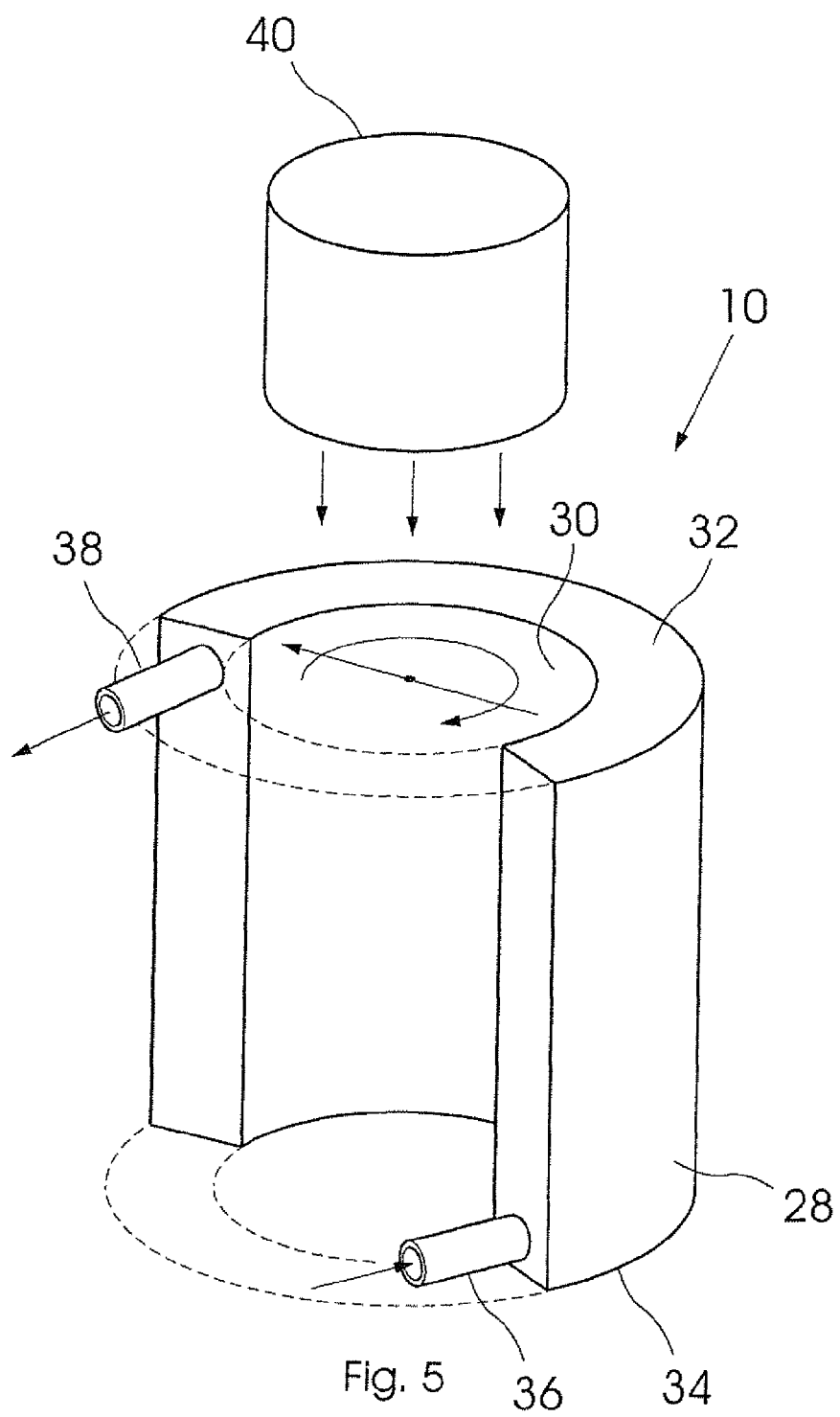
FIG. 5 is a partially cut away schematic diagram of an alternative embodiment of a treatment chamber of the apparatus

FIG. 5 shows schematically an example embodiment of a treatment chamber which forms part of apparatus operating on the above described principles. The treatment chamber 10 is generally cylindrical, with a cylindrical outer wall 28, an inner wall 30 coaxial with the outer wall, and opposed end walls 32 and 34. Thus, the treatment chamber defines a volume which is annular in plan. The treatment chamber is provided with a fluid inlet 36 near one end wall 34 thereof, and a fluid outlet 38 near the opposed end wall 32. Fluid under pressure can be introduced into the treatment chamber via the inlet, and moves about the chamber with a swirling motion until it is exhausted via the outlet.

The illustrated treatment chamber can form part of an installation for purifying liquids, particularly water, using nanoparticles having magnetic properties as well as appropriate characteristics for purifying the water. The treatment chamber is surrounded by a magnetic field generator as described above, in order to generate a rotating magnetic field within the treatment chamber. Preferably the rotating magnetic field rotates in the opposite sense to the swirling rotation of the water in the reaction chamber. This enhances contact between the nanoparticles and the water to be treated.

To prevent the nanoparticles from being expelled from the reaction chamber when the apparatus is in use, an auxiliary magnetic field generator 40 is arranged to generate a magnetic field which interacts with the nanoparticles to urge them towards the inlet end of the treatment chamber. The auxiliary magnetic field generator could be a permanent magnet of suitable shape and magnetic properties, or a suitable electromagnet energized by a direct current, for example.

The described apparatus has a number of advantages. Compared with apparatus which physically agitates a fluid to be treated, the described apparatus does not require moving parts with associated wear and maintenance issues. Since it is only the magnetic particles in the fluid to be treated that need to be agitated, rather than the fluid itself, the apparatus requires less power than an otherwise similar apparatus seeking to excite the fluid. Additionally, exciting the fluid will tend to cause an increase in pressure in the fluid due to sloshing and other related fluid movements which may require a reinforced treatment chamber, a problem which is avoided by the described approach.

It will be appreciated that although a magnetic field generator which creates a rotating magnetic field in a cylindrical chamber is described, other configurations of the invention are possible. For example, arrangements in which a linear, oscillating or reciprocating motion is imparted to the magnetic particles are possible, and various differently shaped treatment chambers can be used.

The invention claimed is:

1. A method of treating a fluid, the method comprising:
    introducing a volume of fluid to be treated into a treatment chamber together with a quantity of magnetic particles, wherein the
    fluid is introduced under pressure via an inlet and moves about the treatment
    chamber with a swirling motion until it is exhausted via an outlet; and
    generating a non-static rotating magnetic field within the treatment chamber to induce a rotary motion in the magnetic particles within the treatment chamber, thereby to increase interaction of the magnetic particles with the fluid to be treated, wherein the rotating magnetic field rotates in an opposite sense to the swirling motion of the fluid in the treatment chamber; and
    wherein to prevent the magnetic particles from being expelled from the treatment chamber when the treatment chamber is in use, an auxiliary magnetic field is generated which interacts with the magnetic particles to urge them towards the inlet end of the treatment chamber.

2. The method of claim 1 wherein the rotating magnetic field is generated by three pairs of windings connected to a three phase alternating current (AC) supply so that the respective currents in the windings vary sinusoidally in time and the current in each pair of windings is time-shifted by 120 degrees relative to the current in the adjacent windings.

3. The method of claim 1 wherein the magnetic particles are nanoparticles having both magnetic properties responsive to the non-static rotating magnetic field, and chemical properties for treating the fluid.

* * * * *